US010066552B2

(12) United States Patent
Jiang et al.

(10) Patent No.: US 10,066,552 B2
(45) Date of Patent: Sep. 4, 2018

(54) ONE DEGREE-OF-CONSTRAINT SEMI-FUSIBLE GEARBOX MOUNTING LINK

(71) Applicant: Hamilton Sundstrand Corporation, Charlotte, NC (US)

(72) Inventors: Yiwei Jiang, Rockford, IL (US); Michael R. Blewett, Stillman Valley, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 151 days.

(21) Appl. No.: 15/069,420

(22) Filed: Mar. 14, 2016

(65) Prior Publication Data
US 2017/0260908 A1    Sep. 14, 2017

(51) Int. Cl.
| | |
|---|---|
| *F02C 7/32* | (2006.01) |
| *F16H 57/025* | (2012.01) |
| *F01D 25/28* | (2006.01) |
| *F16H 57/028* | (2012.01) |
| *B64D 27/26* | (2006.01) |

(52) U.S. Cl.
CPC .............. *F02C 7/32* (2013.01); *F01D 25/28* (2013.01); *F16H 57/025* (2013.01); *F16H 57/028* (2013.01); *B64D 2027/268* (2013.01); *F05D 2260/30* (2013.01); *F05D 2260/311* (2013.01);
(Continued)

(58) Field of Classification Search
CPC ...... F02C 7/32; F02C 7/20; F02C 7/36; F16H 57/025; F05D 2260/37; F05D 2260/311; F05D 2260/30; F05D 2260/3011; F05D 2240/90; F05D 2240/91; F05D 2240/9151; B64D 27/26; B64D 2027/262; B64D 2027/264; B64D 2027/266;
(Continued)

(56) References Cited

U.S. PATENT DOCUMENTS

| | | | |
|---|---|---|---|
| 4,500,054 A | 2/1985 | Osborn | |
| 5,474,258 A * | 12/1995 | Taylor | ................... B64D 27/26 244/54 |

(Continued)

FOREIGN PATENT DOCUMENTS

| | | |
|---|---|---|
| EP | 1010878 A2 | 12/1999 |
| WO | WO2014/100817 A1 | 6/2014 |

OTHER PUBLICATIONS

Extended European Search Report for EP Application No. 17160387.1, dated Aug. 9, 2017, 9 pages.

*Primary Examiner* — Keith J Frisby
(74) *Attorney, Agent, or Firm* — Kinney & Lange, P.A.

(57) ABSTRACT

A mounting link between an engine and a gearbox comprises an engine attachment piece, a gearbox attachment piece, and primary and secondary retention fasteners. The engine attachment piece is rotatably secured to the engine, and the gearbox attachment piece is rotatably secured to the gearbox. The primary retention fastener rigidly constrains the gearbox attachment piece with respect to the engine attachment piece in a single degree of freedom, but is configured to shear at a breakpoint load. The secondary retention fastener constrains the gearbox attachment piece loosely with respect to the engine attachment piece, and can withstand the breakpoint load. The gearbox attachment piece and engine attachment piece abut in a friction fit that provides Coulomb damping.

5 Claims, 3 Drawing Sheets

(52) U.S. Cl.
CPC ...... *F05D 2260/36* (2013.01); *F05D 2260/96* (2013.01)

(58) Field of Classification Search
CPC . B64D 2027/268; Y10T 403/11; F01D 21/04; F01D 25/28; Y10S 248/909
USPC ............. 244/54; 248/554; 60/796, 797; 74/606 R; 403/2
See application file for complete search history.

(56) References Cited

U.S. PATENT DOCUMENTS

| | | | |
|---|---|---|---|
| 5,860,623 A * | 1/1999 | Dunstan ............. | B64D 27/18 244/54 |
| 5,921,500 A * | 7/1999 | Ellis ................. | B64D 27/20 244/54 |
| 5,927,644 A * | 7/1999 | Ellis ................. | B64D 27/26 244/54 |
| 6,170,252 B1 | 1/2001 | Van Duyn | |
| 6,212,974 B1 | 4/2001 | Van Duyn | |
| 7,942,580 B2 * | 5/2011 | Audart-Noel ........ | B64D 27/26 244/54 |
| 9,227,734 B2 * | 1/2016 | Zheng ............... | B64D 27/26 |
| 2004/0216461 A1 | 11/2004 | Wallace et al. | |
| 2011/0239660 A1 | 10/2011 | Suciu et al. | |
| 2013/0180262 A1 | 7/2013 | Duong | |
| 2014/0127000 A1 | 5/2014 | Abousleiman et al. | |
| 2014/0130628 A1 | 5/2014 | Abousleiman et al. | |
| 2016/0083101 A1 * | 3/2016 | Ronski ............... | F16F 9/10 60/783 |

* cited by examiner

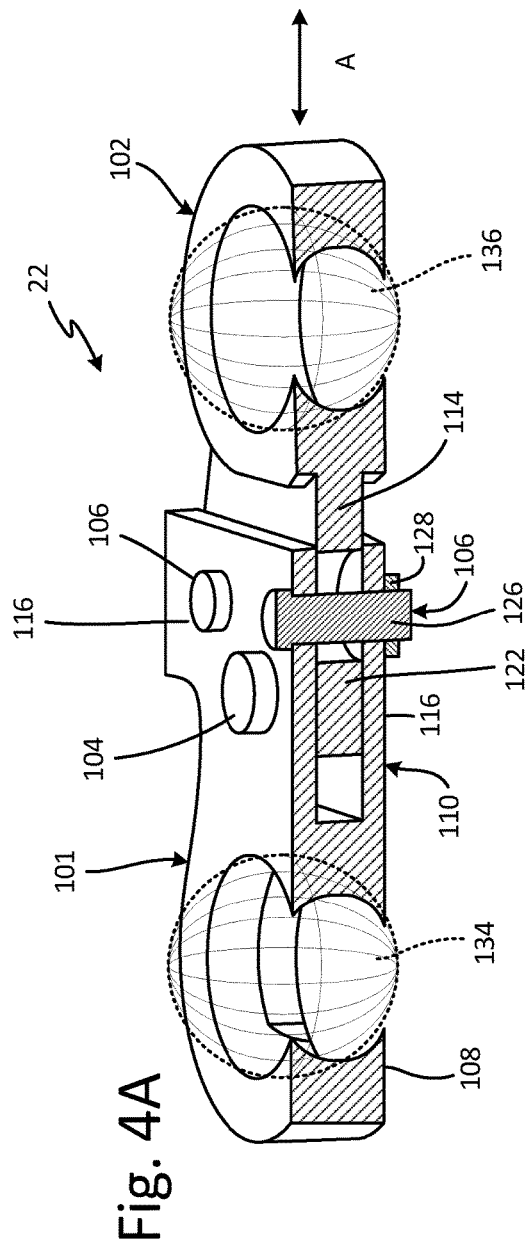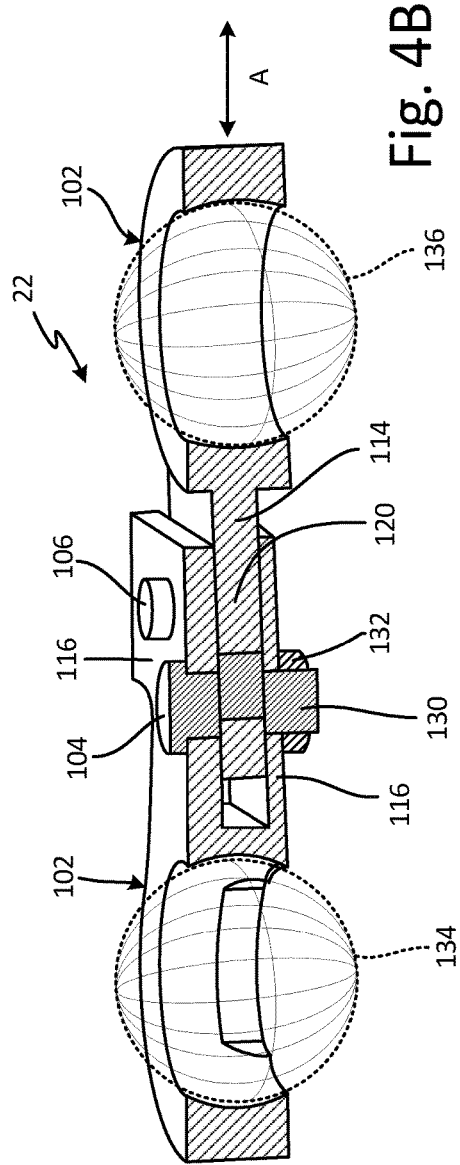

… (1) …

ONE DEGREE-OF-CONSTRAINT SEMI-FUSIBLE GEARBOX MOUNTING LINK

BACKGROUND

The present invention relates generally to support structures, and more particularly to a mounting link between an engine structure and an attached structure such as an auxiliary gearbox.

Aircraft gas turbine auxiliary gearboxes are expected to withstand a variety of loads, from routine vibrational loads to sudden or extreme shocks caused by hard landings. The most extreme loads come from so-called "blade-off" events, when blades of the engine detach due to impacts or the like, causing severe shocks and often major damage to the working engines. Blade-off event loads are extremely unpredictable, but can be more than an order of magnitude stronger than any other sudden or extreme shock gas turbine engines are expected to experience, such as impacts due to hard landings. Extreme loads can cause damage to the gearbox itself, as well as to attached peripheral systems driven by the gearbox. In addition, extreme loads that damage or disconnect parts of the gearbox from the engine can result in potentially dangerous oil leakages. For all of these reasons conventional gearboxes and gearbox connections are constructed to rigidly withstand all anticipated loads.

SUMMARY

In one aspect, the present invention is directed toward a mounting link between an engine and a gearbox. The mounting link comprises an engine attachment piece, a gearbox attachment piece, and primary and secondary retention fasteners. The engine attachment piece is rotatably secured to the engine, and the gearbox attachment piece is rotatably secured to the gearbox. The primary retention fastener rigidly constrains the gearbox attachment piece with respect to the engine attachment piece in a single degree of freedom, but is configured to shear at a breakpoint load. The secondary retention fastener constrains the gearbox attachment piece loosely with respect to the engine attachment piece, and can withstand the breakpoint load. The gearbox attachment piece and engine attachment piece abut in a friction fit that provides Coulomb damping.

In another aspect, the present invention is directed toward a method of retaining a gearbox with respect to a gas turbine engine structure. An engine attachment piece is secured to the gas turbine engine structure, and a gearbox attachment piece is secured to the gearbox. A breakable primary retention fastener is inserted tightly through the engine attachment piece and the gearbox attachment piece, thereby retaining the engine attachment piece rigidly with respect to the gearbox attachment piece, along an axis defining a single degree of freedom. A durable secondary retention fastener is inserted tightly through the engine attachment piece, and through an oblong fastener passage of the gearbox piece, such that the oblong passage provides clearance from the engine attachment piece along the axis.

The present summary is provided only by way of example, and not limitation. Other aspects of the present disclosure will be appreciated in view of the entirety of the present disclosure, including the entire text, claims, and accompanying figures.

BRIEF DESCRIPTION OF THE DRAWINGS

FIGS. 4a and 4b are sectional perspective views of the mounting link of FIGS. 2 and 3, through section lines A-A and B-B, respectively, shown in FIG. 2.

Figure 1:
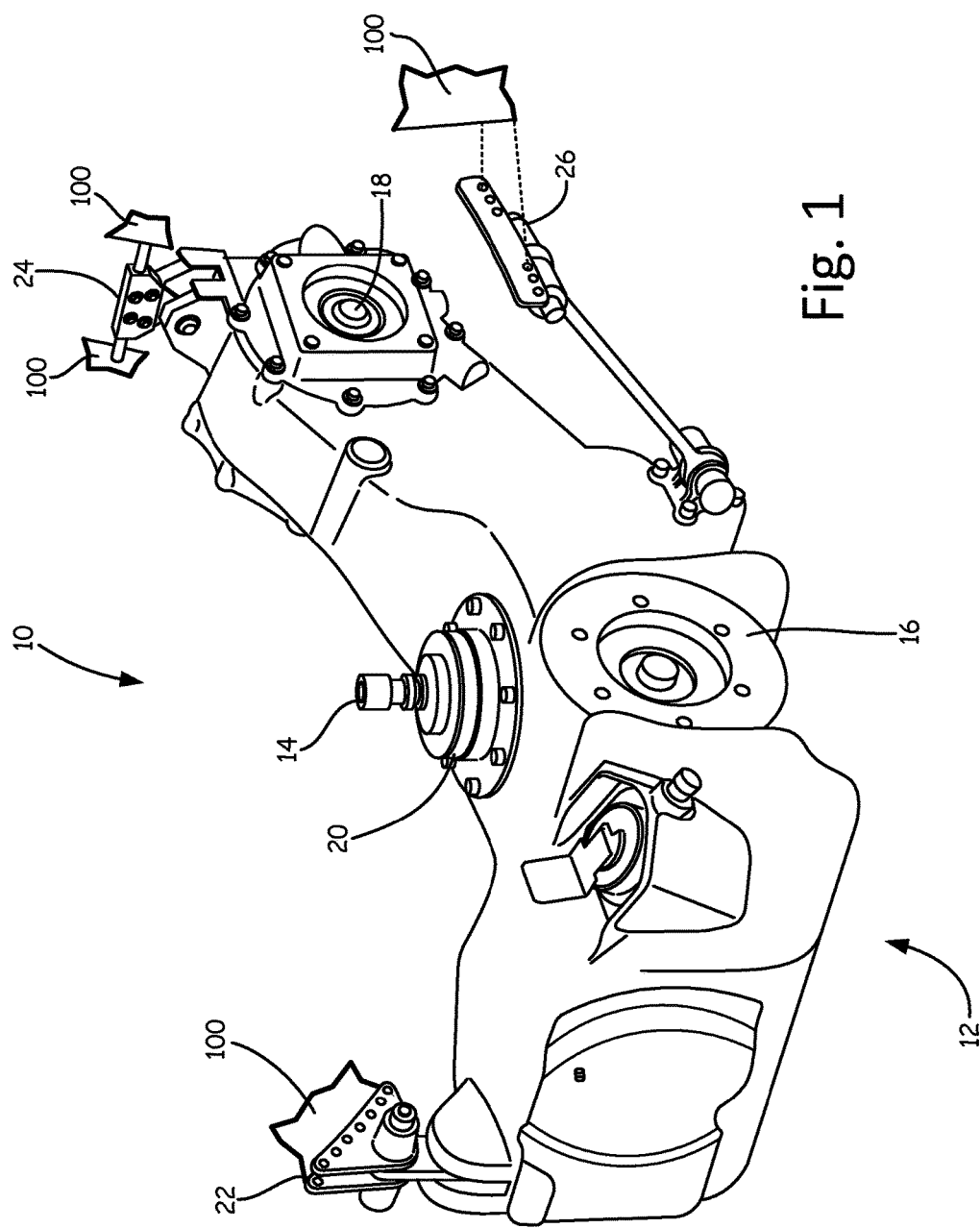
FIG. 1 is a perspective view of an auxiliary gearbox for a gas turbine engine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present invention connects an engine to a gearbox via a mounting link comprising a two-sided engine attachment piece and a gearbox attachment piece snugly secured between sides of the engine attachment piece. The engine attachment piece and gearbox attachment piece connect rotatably to the engine structure and gearbox, respectively. The engine attachment piece and gearbox attachment piece are connected via a breakable primary fastener and a durable secondary fastener. The breakable primary fastener secures the engine attachment piece rigidly in a single degree of freedom with respect to the gearbox attachment piece, but is configured to break under a breakpoint load. The durable secondary fastener secures the engine attachment and loosely constrains the engine attachment piece in a single degree of freedom with respect to the gearbox attachment piece, and is capable of withstanding the breakpoint load.

FIG. 1 is a perspective view of gearbox assembly 10, which includes gearbox 12 and supporting elements sufficient to secure gearbox 12 with respect to engine 100. Engine 100 is depicted only schematically, and can, for example, be an aircraft gas turbine engine with a structural engine case, or another engine component to which gearbox 12 is secured. Gearbox assembly 10 includes driveshaft connection 14, peripheral load connections 16 and 18, seal 20, and mounting links 22, 24, and 26. Gearbox 12 can, for example, be an auxiliary gearbox disposed to transmit torque from engine 100 to a variety of peripheral loads not directly related to operation of engine 100 or to propulsion (e.g. to a generator or air circulation system).

Driveshaft connection 14 attaches to a shaft of engine 100 for torque transmission. Peripheral load connections 16 and 18 are two illustrative auxiliary driveshaft connection points for attachment of peripheral loads to gearbox 12. Peripheral loads can include any systems driven by, but not included within, engine 100, including but not limited to air circulation systems and electrical generators. Although only two peripheral load connections 16 and 18 are depicted in FIG. 1, gearbox 12 can more generally support any number and location of peripheral load connections.

Seal 20 and mounting links 22, 24, and 26 collectively constrain gearbox 12 with respect to gas turbine engine structure 100 in all six translational and rotational degrees of freedom, without overconstraining gearbox 12. Seal 20 can, for example, be a spigot-type annular seal that constrains gearbox 12 in two degrees of freedom corresponding to the normal basis of the reference plane on which seal 20 lies. In the depicted embodiment, mounting links 22 and 26 each provide a single independent degree of constraint, while mounting link 24 provides two more independent degrees of constraint. More generally, the collection of all linkages connecting gearbox 12 to engine 100 (including seal 20) provides a total of six independent constraints on the translational and rotational freedom of gearbox 12 with respect to engine 100. In alternative embodiments, these constraints can be distributed about more or fewer separate linkages. The independence of these constraints prevents overconstraint (e.g. two links constraining the same degree of freedom) that would necessitate tighter tolerances and could increase damage done to the gearbox and/or the linkages in the event of severe impacts. The locations and number of degrees of freedom constrained by each linkage may vary across different embodiments, so long as the collection of all linkages constrains all six degrees of freedom without significantly overconstraining any.

Figure 2:
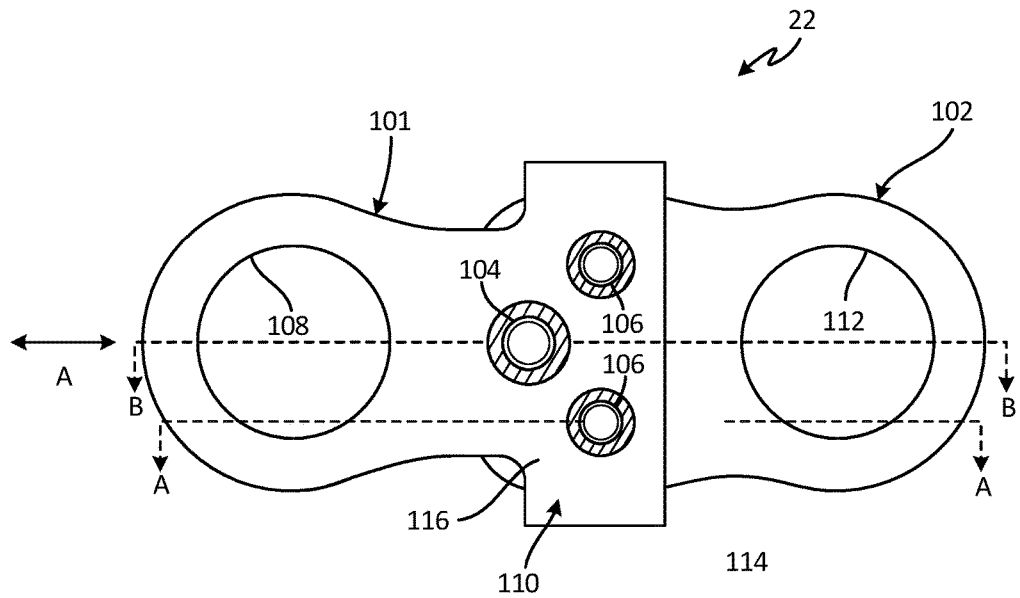
FIG. 2 is a plan view of an embodiment of a mounting link between the gas turbine engine and the auxiliary gearbox.

FIG. 2 is a plan view of an embodiment of mounting link 22, illustrating engine attachment piece 101, gearbox attachment piece 102, primary retention fastener 104, and secondary retention fasteners 106. Engine attachment piece 101 has engine connection section 108 and engine link section 110, while gearbox attachment piece 102 has gearbox connection section 112, gearbox link section 114, and engine link section plate 116. Mounting link 22 is a support structure disposed between gearbox 12 and engine 100 to constrain movement of gearbox 12 relative to engine 100 in a single translational degree of freedom defined by axis A.

Engine attachment piece 101 and gearbox attachment piece 102 are rigid support structures aligned along axis A. Engine attachment piece 101 includes engine connection section 108, an attachment point where engine attachment piece 101 is secured to engine 100 (see FIG. 1). Gearbox attachment piece 102 similarly includes gearbox connection section 112, an attachment point where gearbox attachment piece 102 is secured to gearbox 12. In the depicted embodiment, both engine attachment section 108 and gearbox attachment 112 are ring-shaped cups disposed to receive spherical bearings (see FIGS. 4a and 4b, described below). In other embodiments, engine attachment section 108 and gearbox attachment section 112 can include any rotatable, load-bearing connections between mounting link 22 and engine 100 or gearbox 12, respectively. Engine attachment piece 101, gearbox attachment piece 102, primary retention fastener 104, and secondary retention fasteners 106 can, for example, be formed of rigid alloys such as steel. Engine attachment piece 101, gearbox attachment piece 102, primary retention fastener 104, and secondary retention fasteners 106 need not be made of the same material.

Engine attachment piece 101 includes engine link section 110, a connecting structure extending from engine connection section 108 towards gearbox 12. In the illustrated embodiment, engine link section 110 is a T-shaped structure that includes two parallel engine link section plates 116 (see FIGS. 3, 4a, and 4b). Engine link section plates 116 abut and bracket gearbox link section 114, a planar section of gearbox connection piece 102 that extends from gearbox connection section 112 towards engine 100. Engine attachment piece 101 and gearbox attachment piece 102 overlap axially at engine link section 110 and gearbox link section 114. Primary retention fastener 104 and secondary retention fasteners 106 pass through both engine link section 110 and gearbox link section 114, thereby securing engine attachment piece 101 and gearbox attachment piece 102 together. Primary retention fastener 104 acts as a mechanical fuse: in the event of an extreme load or shock, such as during a fan blade off event, for example, primary retention fastener breaks, leaving engine attachment piece 101 and gearbox attachment piece 102 more loosely connected via secondary retention fasteners 106 alone, as explained in greater detail below.

Although the present figures depict gearbox link section 110 as including parallel engine link section plates 116 that bracket gearbox link section, some embodiments can reverse these structures, such that gearbox link section 114 includes parallel plates that bracket and abut at least one element of engine link section 110.

Figure 3:
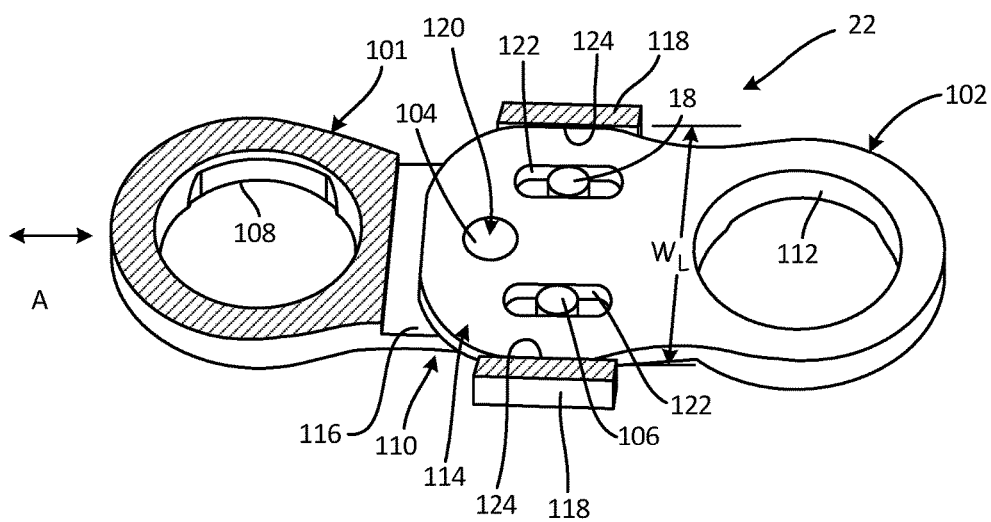
FIG. 3 is a cutaway perspective view of the mounting link of FIG. 2.

FIG. 3 is a cutaway perspective view of mounting link 22 with one engine link section plate 116 removed to expose gearbox link section 114. FIG. 3 illustrates engine attachment piece 101 (with engine connection section 108 and engine link section 110 comprising link section plates 116), gearbox attachment piece 102 (with gearbox connection section 112 and gearbox link section 114), primary retention fastener 104, and secondary retention fasteners 106, all as described above with respect to FIG. 2. FIG. 3 additionally illustrates endwalls 118 of engine link section 110, primary gearbox fastener passage 120 for primary retention fastener 104, and secondary gearbox fastener passages 122 for secondary retention fastener 106. Endwalls 118 have endwall inner surfaces 124 in tight contact with immediately adjacent edges of gearbox link section 114.

As described above with respect to FIG. 2, in one embodiment engine link section 110 includes engine link section plates 116 that bracket and abut gearbox link section 114. Primary and secondary retention fasteners 104 and 106, respectively, connect engine link section 110 and gearbox link section 114. Primary retention fastener 104 passes snugly through primary gearbox fastener passage 120, an aperture through gearbox link section 114 that fits primary retention fastener 104 with minimal clearance in any direction. Secondary retention fasteners 106 pass through secondary gearbox fastener passages 122. In contrast to primary gearbox fastener passage 120, secondary gearbox fastener passages 122 are separated from secondary retention fasteners 106 by considerable clearance in at least an axial direction (i.e. along axis A). In the illustrated embodiment, secondary gearbox fastener passages 122 are oblong, racetrack-shaped apertures that substantially match a width of secondary retention fasteners 106 in a dimension transverse to axis A, but with significantly greater width along axis A than the width of secondary retention fastener 106.

Primary retention fastener 104 retains engine attachment piece 101 rigidly with respect to gearbox attachment piece 102, and accordingly rigidly constrains gearbox 12 with respect to engine 100 along axis A. Primary retention fastener 104 is designed to shear or otherwise break at a known load magnitude corresponding to the maximum structural capability of the gearbox assembly 12, the unfused mount components, and the engine mounting structure 100. This can be accomplished by selecting an appropriately durable width and material for primary retention fastener 104, or by encouraging shear through primary retention fastener 104 with grooves or similar geometry. In general, primary retention fastener 104 must be at least strong enough to withstand peak non-destructive impact loads such as low cycle loads from hard landings and other non-routine but expected shocks. These loads can, for example, reach 10-15 Gs. In at least some embodiments, primary retention fastener 104 will not break until loads at least 10-25 times higher than expected low cycle loads. Very few loads experienced during aircraft engine operation reach these levels, but shocks due to blade-off events can be high enough to shear or break primary retention fastener 104.

In the event of a load or shock sufficient to destroy primary retention fastener 104, engine attachment piece 101 is retained instead by secondary retention fasteners 106, which are durable to higher loads. In some embodiments, for example, secondary retention fasteners 106 can be durable to loads of 100 Gs or more. Because secondary retention fasteners 106 pass through secondary gearbox fastener passages 122, however, the oblong geometry of gearbox fastener passages 122 permits an increased degree of mechanical play between engine attachment piece 101 and gearbox attachment piece 102 along axis A. This increased mechanical play serves to attenuate loads while still constraining the relative position of gearbox 12 with respect to engine 100, in a dimension described by axis A.

Endwalls 118 connect engine link section plates 116, which bracket gearbox link section 114 in the illustrated embodiment. Endwalls 118 extend axially, are substantially perpendicular to engine link section plates 116, and are separated by a lateral (i.e. perpendicular to axis A) distance equal to or slightly less than lateral width $W_L$ of gearbox link section 114, such that gearbox link section 114 rubs against endwall inner surfaces 124 of endwalls 118 in an interference fit. In some embodiments, this interference fit can also provide damping friction in a direction along the axes of fasteners 106. This friction fit provides Coulomb damping that reduces transmission of vibratory loads from engine 100 to gearbox 12. In at least some embodiments, lateral width $W_L$ can exceed the unstressed separation between endwall inner surfaces 124, such that mount link 22 must be assembled by press fitting gearbox link section 114 into engine link section 110.

FIGS. 4a and 4b are cross-sectional perspective views of mounting link 22 of FIGS. 1, 2, and 3, through section lines A-A and B-B, respectively, shown in FIG. 2. FIGS. 4a and 4b illustrate engine attachment piece 101, gearbox attachment piece 102, primary retention fastener 104, and secondary retention fastener 106 as described above. FIG. 4a further illustrates secondary retention bolt 126 and secondary retention nut 128 of secondary retention fastener 106, while FIG. 4b further illustrates primary retention bolt 130 and primary retention nut 132 of primary retention fastener 104. FIGS. 4a and 4b additionally illustrate spherical bearings 134 and 136 in phantom.

In the illustrated embodiment, primary retention fastener 104 and secondary retention fasteners 106 include primary and secondary retention bolts 130 and 126, respectively, that pass entirely through gearbox link section 114 and both engine link section plates 116 of engine link section 110, and are secured via primary and secondary retention nuts 132 and 128, respectively. In alternative embodiments, however, primary retention fasteners 104 and 106 can be connecting fasteners of other types, including rods or pins secured through engine connection section 108 and engine link section 110, or screws retained in threading of one or more of engine link section 110 and gearbox link section 114, and embedded in both, but not passing entirely through at least one of engine link section 110 and gearbox link section 114. Similarly, although the present figures depict a single primary retention fastener 104 and two secondary retention fasteners 106 all disposed symmetrically across axis A, alternative embodiments of the present invention may include more than one primary retention fastener 104, and/or more or fewer than two secondary retention fasteners.

Primary retention fastener 104 rigidly constrains gearbox attachment piece 102 with respect to engine attachment piece 101 during normal operating conditions. Under extreme loads, however, primary retention fasteners 104 are configured to shear or otherwise break. Secondary retention fasteners 106 do not transmit loads between engine attachment piece 101 and gearbox attachment piece 102 during normal operating conditions, but in the event of a load or shock sufficient to break primary retention fastener 104, secondary retention fasteners 106 retain gearbox attachment piece 102 with respect to engine attachment piece 101 as a backup, in a looser (i.e. less rigid) connection with increased mechanical play. This increased mechanical play allows mounting link 22 to retain gearbox 12 loosely even in the event of extreme shock events that could otherwise cause damage to gearbox 12, engine 100, or attached components. A friction fit between engine link section 110 and gearbox link section 114 provides Coulomb damping that reduces vibration transmission from engine 100 to gearbox 12.

Discussion of Possible Embodiments

The following are non-exclusive descriptions of possible embodiments of the present invention.

A gearbox mounting link between a gas turbine engine structure and a gearbox mounting location, the mounting link comprising: an engine attachment piece configured to be rotatably secured to a gas turbine engine structure, the engine attachment piece comprising an engine attachment portion and a first link connection portion; a gearbox attachment piece configured to be rotatably secured to a gearbox, the gearbox attachment piece comprising a gearbox attachment portion and a second link connection portion;

a breakable primary retention element rigidly constraining the gearbox attachment piece with respect to the engine attachment piece in a single degree of freedom, and configured to shear at a breakpoint load; and a durable secondary retention element loosely constraining the gearbox attachment piece with respect to the engine attachment piece in the single degree of freedom, and configured to withstand the breakpoint load; wherein one of the first and second link connection portions comprises paired plates separated by a gap and connected by endwalls bracketing the gap, and the other of the first and second link connection portions comprises a single plate situated within the gap, between the paired plates, in a friction fit with the endwalls;

The gearbox mounting link of the preceding paragraph can optionally include, additionally and/or alternatively, any one or more of the following features, configurations and/or additional components:

A further embodiment of the foregoing gearbox mounting link, wherein: the paired plates have paired passages sized to snugly receive the breakable primary retention element and the durable secondary retention element; the single plate has a primary passage sized to snugly receive the durable secondary retention element; and the single plate has a secondary passage with an oblong shape sized to provide clearance from the durable secondary retention element, while the breakable primary retention element remains intact.

A further embodiment of the foregoing gearbox mounting link, wherein at least one of the engine attachment portion and the gearbox attachment portion comprises a spherical bearing cup.

A further embodiment of the foregoing gearbox mounting link, wherein the first link connection portion comprises the paired plates.

A further embodiment of the foregoing gearbox mounting link, wherein the single degree of freedom is along a displacement axis defined between the engine attachment portion and the gearbox attachment portion.

A further embodiment of the foregoing gearbox mounting link, wherein the endwalls extend parallel to the displacement axis.

A further embodiment of the foregoing gearbox mounting link, the endwalls are separated by a first width in a lateral dimension perpendicular to the displacement axis; and the single plate has a second width within 0.05 inches of the first width in the lateral dimension, and is press-fit between the endwalls.

A further embodiment of the foregoing gearbox mounting link, wherein the second width is slightly greater than the first width, such that the friction between the single plate and the endwalls reduces vibration transmission through the gearbox mounting link by Coulomb damping.

A further embodiment of the foregoing gearbox mounting link, wherein the single plate receives the durable secondary retention element through a secondary passage with an oblong shape longest along the displacement axis.

A further embodiment of the foregoing gearbox mounting link, wherein the engine attachment piece and the gearbox attachment piece are formed of steel.

A further embodiment of the foregoing gearbox mounting link, wherein the breakable primary retention element is configured to withstand a load of at least 15 Gs.

A further embodiment of the foregoing gearbox mounting link, wherein the breakable primary retention element is configured to break under a load less than 100 Gs.

A method of attaching a gearbox to an engine structure along an axis defining a single degree of freedom, the method comprising: securing an engine attachment piece to the engine structure; attaching a gearbox attachment piece to the gearbox; slidably connecting the gearbox attachment piece to the engine attachment piece, such that the gearbox attachment piece is able to move along a single axis over a selected stroke length, with respect to the engine attachment piece; and fixedly securing the gearbox attachment piece to the engine attachment piece via a force failing member until a load on the force failing member exceeds a selected value.

The method of the preceding paragraph can optionally include, additionally and/or alternatively, any one or more of the following features, configurations and/or additional components:

A further embodiment of the foregoing method, further comprising: shearing the force failing member under a load of at least the selected value; and subsequently loosely retaining the gearbox attachment piece with respect to the engine attachment piece in at least the single axis.

A further embodiment of the foregoing method, further comprising tightly positioning one of the engine attachment piece and the gearbox attachment piece in an interference fit between sections of the other of the engine attachment piece and the gearbox attachment piece.

A gearbox to engine mounting arrangement comprising: an engine attachment piece attachable to the engine; a gearbox attachment piece attachable to the gearbox being slidably movably engaged with the engine attachment piece such that the slidable movement is along a single axis over a selected stroke length; and a force failing member in operable communication with the engine attachment piece and the gearbox attachment piece preventing the slidable movement until loads on the force failing member have exceeded a selected value.

The gearbox-to-engine mounting arrangement of the preceding paragraph can optionally include, additionally and/or alternatively, any one or more of the following features, configurations and/or additional components:

A further embodiment of the foregoing gearbox-to-engine mounting arrangement, wherein the slidable movement requires overcoming frictional engagement between the engine attachment piece and the gearbox attachment piece.

A further embodiment of the foregoing gearbox-to-engine mounting arrangement, wherein the stroke length is defined by pins fixed to one of the engine attachment piece and the gearbox attachment piece that moves within slots of the other of the engine attachment piece and the gearbox attachment piece.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gearbox-to-engine mounting arrangement comprising:
　an engine attachment piece attachable to the engine;
　a gearbox attachment piece attachable to the gearbox and slidably movably engaged with the engine attachment piece such that the slidable movement is along a single axis over a selected stroke length; and
　a force failing member in operable communication with the engine attachment piece and the gearbox attachment piece preventing the slidable movement until loads on the force failing member have exceeded a selected value;
　wherein the stroke length is defined by pins fixed to one of the engine attachment piece and the gearbox attachment piece that move within slots of the other of the engine attachment piece and the gearbox attachment piece.

2. The gearbox-to-engine mounting arrangement of claim 1, wherein the slidable movement requires overcoming frictional engagement between the engine attachment piece and the gearbox attachment piece.

3. A method of attaching a gearbox to an engine structure along an axis defining a single degree of freedom using the gearbox-to-engine mounting arrangement of claim 1, the method comprising:
　securing the engine attachment piece to the engine structure;
　attaching the gearbox attachment piece to the gearbox;

slidably connecting the gearbox attachment piece to the engine attachment piece, such that the gearbox attachment piece is able to move along a single axis over a selected stroke length, with respect to the engine attachment piece; and fixedly securing the gearbox attachment piece to the engine attachment piece via the force failing member until a load on the force failing member exceeds a selected value.

4. The method of claim 3, further comprising:

shearing the force failing member under a load of at least the selected value; and subsequently loosely retaining the gearbox attachment piece with respect to the engine attachment piece in at least the single axis.

5. The method of claim 3, further comprising:

tightly positioning one of the engine attachment piece and the gearbox attachment piece in an interference fit between sections of the other of the engine attachment piece and the gearbox attachment piece.

\* \* \* \* \*